Jan. 12, 1960 A. F. A. BARTELS ET AL 2,920,343
PROCESS FOR SEVERING THE HEADS OF FISH
Filed June 11, 1957

INVENTORS:
A.F.A. Bartels, P. Friedrich and W. Jobmann
BY
Richards & Geier
ATTORNEYS

United States Patent Office 2,920,343
Patented Jan. 12, 1960

2,920,343

PROCESS FOR SEVERING THE HEADS OF FISH

Alfred Friedrich Adolf Bartels and Paul Friedrich Wilhelm Jobmann, Luebeck, Germany Application June 11, 1957, Serial No. 665,007

1 Claim. (Cl. 17—45)

This invention relates to a process and apparatus for severing the heads of fish and is a continuation in part of our patent application Serial No. 380,204, filed July 23, 1953, for a Charging Device for Fish Processing Apparatus, now Patent No. 2,803,035, issued August 20, 1957.

In the art of processing fish the severing of the heads of the fish is often a rather difficult operation, since the heads must be cut off with as little as possible waste as far as the valuable fish meat is concerned.

One of the difficulties encountered in carrying out this operation on a large scale is that the fish bodies, even after being sorted according to size, still vary in dimensions to a substantial extent. Another difficulty is that the fish have usually meat or flesh portions which extend into the head of the fish at the back and the mouth to a greater extent than upon the sides where the gills are located. The above drawbacks made it quite difficult to provide machinery for severing the heads of fish in a fish processing plant.

An object of the present invention is the provision of method and means for severing the heads of fish wherein the above-described drawbacks are effectively eliminated.

Other objects of the present invention will become apparent in the course of the following specification.

In accomplishing the objects of the present invention it was found that the severing of the heads of fish from fish bodies can be carried out effectively if the fish is placed upon a movable carrier in a position in which the body extends transversely to the direction of the movement, and if the gills of the fish are utilized for the purpose of shifting the fish body in its longitudinal direction while it is upon the carrier until the body is located in a desired position for severing purposes. Thus, the gills of the fish are utilized as supporting points to place the fish body in the correct position in which the head is cut off by a so-called wedge cut, whereby the cut extends in the longitudinal plane of symmetry of the fish body.

Due to this arrangement the cutting takes place at the selected best possible location and the valuable meat sections at the neck and the throat which extend into the head, are not cut off with the head and are preserved for consumption.

The invention will appear more clearly from the following detailed description when taken in connection with the accompanying drawings showing, by way of example, a preferred embodiment of the inventive idea.

Figure 1:
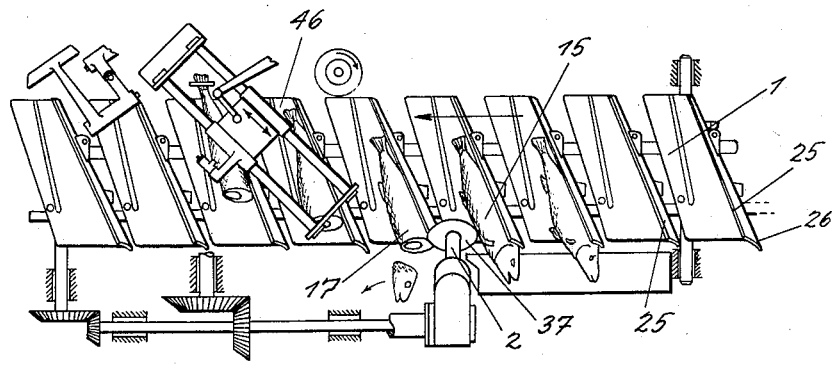
Figure 1 is a schematic view of the charging and head severing device constructed in accordance with the principles of the present invention.

Referring now in greater detail to the drawings where like reference numerals indicate like parts, 1 indicates the charging device and 2 the head severing device.

In the charging device there is a conveyor constituted by two open link chains 22 forming endless bands running over wheels 23 which are keyed upon a shaft 24. Only part of the conveyor is illustrated in the drawings for the sake of simplicity.

The chains 22 carry tray-like fish troughs 25. As shown in the drawings, the troughs 25 are carried one next to the other upon the chains 22 and they move along with the chains in the direction of the arrow 40 shown in Figure 2. The length of each of the troughs must be greater than the fillet of the largest fish to be processed.

Figure 2:
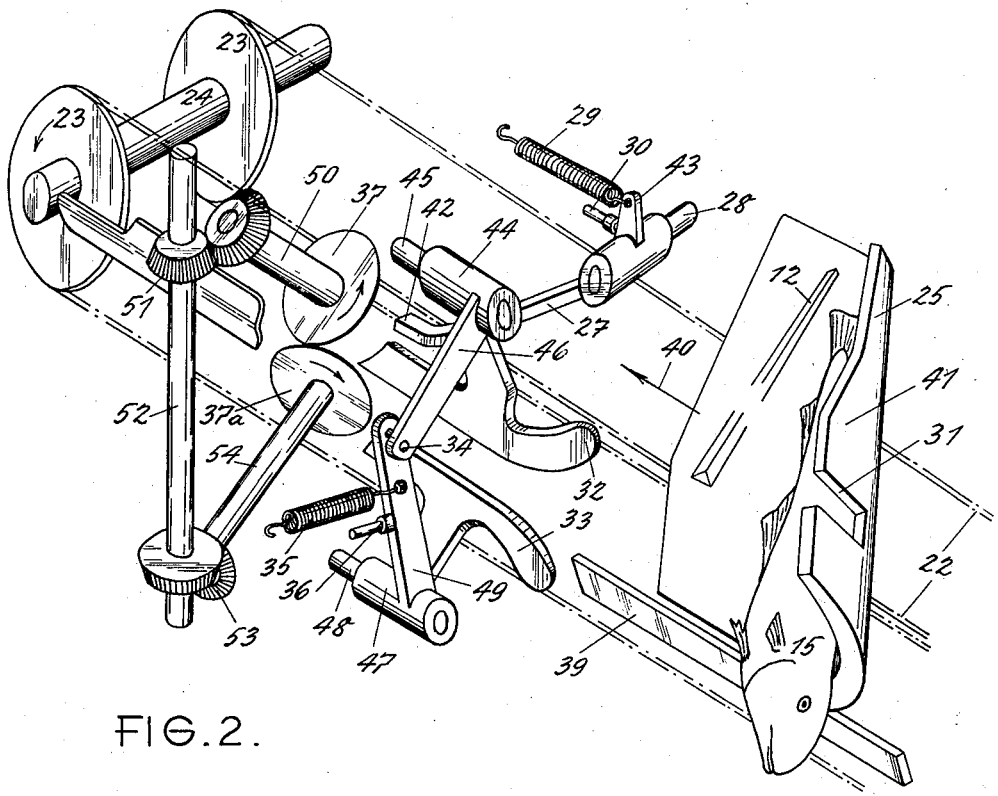
Figure 2 is an enlarged perspective view of the head severing device.

As best shown in Figure 2, each of the troughs 25 has an upturned edge 41 which extends at an acute angle to the direction of the movement of the troughs represented by the arrow 40. The edge 41 has an inner grooved surface against which the fish body 15 is placed. The supporting surface of the trough 25 also carries a guide bar 72. A guide 39 is located close to the open wider end of the trough 25 and extends in the direction of movement of the trough represented by the arrow 40. The guide 39, which is connected to a machine frame by any suitable means, not shown in the drawings, engages the projecting portion of the fish body 15 and assists in maintaining the fish body in the proper position during the movement upon the trough 25. Thus the head of the fish overhangs the trough and is located by engagement of the lower gill cover with a fixed guide bar 39 arranged close to the open front end of the trough 25 and extending in the direction of movement of the trough towards the cutting device.

A pressing finger 27 having a flat end 42 extends above the troughs 25. The finger 27 is connected with a pin 28 which is connected to a sleeve 30a attached to a pin 30. The pin 30 is attached to the machine frame, which is not shown in the drawing. The pin 28 is connected through the sleeve 30a to a lever 43, which is engaged by a spring 29. The opposite end of the spring 29 is also attached to the frame (not shown). Due to this arrangement the finger 27 is resiliently pressed downwardly by means of the spring 29.

The finger 27 is so located in relation to the trough 25 that it will engage a fish body 15 carried by a trough and will press the fish body against the curved surface of the edge 41 of the trough. In the course of further movement of the trough 25 the end 42 of the finger 27 will pass through the slot 31 provided for that purpose in the edge 41 of the trough 25.

Two synchronized gill guides 32 and 33 are placed in the path of the fish body 15. The upper gill guide 32 is carried by a sleeve 44 which is mounted upon a pin 45 supported in the machine frame (not shown). The sleeve 44 is firmly connected with an arm 46.

The lower gill guide 33 is connected with a sleeve 47 which is mounted upon a pin 48 carried by the frame. The sleeve 47 is firmly connected with a lever 49 which is connected with the lever 46 by means of a pin 34. A spring 35 is connected to the lever 49 and to the frame (not shown). A pin 36 connected to the lever 49 may be used for adjusting the positions of the gill guides 32 and 33.

The cutting of the head of the fish is carried out by two rotary knives 37 and 37a. The knife 37 is rotatable along with its shaft 50 which is driven through cone gears 51 by a main vertical shaft 52. Cone gears 53 transmit the rotation of the shaft 52 to the shaft 54 carrying the rotary cutting knife 37a.

The operation of severing the heads of the fish bodies 15 is carried out in the following manner:

The fish bodies 15 are placed by an operator upon the troughs 25 while the troughs move forward toward the finger 27, the gill guides 32 and 33 and the cutting knives 37 and 37a in the direction of the arrow 40. The gill guides 32 and 33 will engage the gills of the fish body 15 and will move the body 15 along its longitudinal axis to an extent which is defined by the size of the gills. It is apparent that the gills of the fish body 15 will be used as gripping points during this operation. The guide 39 will assist in maintaining the head portion of the fish in a substantially erect position before the body 15 reaches the gill guides 32 and 33, and will limit the longitudinal displacement of the fish body. The finger 27 will push the fish body 15 against the trough edge 41 while, as already stated, the gill guides 32 and 33 will push the head of the fish beyond the trough 25 to a predetermined desired extent depending upon the size of the fish. It is further apparent that the fish body 15 may contact the guide bar 72 during this movement.

The gill guides 32 and 33 will guide the head of the fish to the cutting knives 37 and 37a. It is apparent that the knives 37 and 37a form a wedge-like cutting element wherein the incisions will take place substantially simultaneously on both sides of the fish.

The result of the operation is a fish body which is free from skull bone and the gills with a minimum of flesh lost.

It is apparent that the example shown above has been given solely by way of illustration and not by way of limitation, and that it is subject to many variations and modifications within the scope of the appended claim.

What is claimed is:

Process for severing the heads of fish, which comprises moving fish bodies in a direction substantially transverse to the longitudinal axis of the fish body, simultaneously displacing the fish body in its longitudinal direction while using the gills of the fish body as a measure for defining the appropriate position of the fish body, moving the fish body to a pre-selected level while using its gills as gripping points, and thereupon severing the head of the fish body by two cuts located symmetrically on opposite sides of the longitudinal plane of symmetry of the fish body, said cuts extending at equal acute angles to said plane in the direction toward the fish head and meeting each other in said plane.

References Cited in the file of this patent

UNITED STATES PATENTS

| | | |
|---|---|---|
| 2,625,706 | Oates | Jan. 20, 1953 |
| 2,625,708 | Oates | Jan. 20, 1953 |
| 2,669,746 | Baader | Feb. 23, 1954 |
| 2,771,633 | Bartels et al. | Nov. 27, 1956 |